INVENTOR
A. W. ZIEGLER
BY
ATTORNEY

INVENTOR
A. W. ZIEGLER
BY
[signature]
ATTORNEY

United States Patent Office 2,697,047

Patented Dec. 14, 1954

2,697,047

METHOD OF PROVIDING A SPOT OF SILVER ON A PIEZOELECTRIC CRYSTAL

Arthur W. Ziegler, Short Hills, N. J., assignor to Bell Telephone Laboratories, Incorporated, New York, N. Y., a corporation of New York Application September 14, 1950, Serial No. 184,821

6 Claims. (Cl. 117—37)

This invention relates to methods of manufacturing piezoelectric crystal devices and more particularly to methods of attaching lead wires to a crystal.

Known methods of attaching lead wires to crystals have resulted in connections that are relatively unstable and subject to considerable variation in pull-off strength. Furthermore, these methods usually require skilled operators to build up bulky solder joints which are necessary to give the connection sufficient strength to be commercially useful. These large solder joints cause an appreciable dissipation of the crystal energy, thus resulting in a lowered Q.

One object of this invention is to improve the construction and facilitate the fabrication of connections to piezoelectric crystals.

A further object of the invention is to secure a wire lead to crystal with relatively small amount of solder, thus reducing the energy dissipated in the joint to a minimum.

Other objects of the invention are to reduce the skill requisite to fasten wire leads to crystals and the improvement of methods of securing wire leads to crystals generally.

In one illustrative embodiment of this invention, a silver paste is slowly mixed at about one revolution per minute and then applied to a limited area of one surface of the crystal. The unit is placed in a furnace having an oxygen containing atmosphere and allowed to come up to a temperature between approximately 510° C. and 570° C. in about ten minutes or more and maintatined at this temperature for five or more minutes and then allowed to gradually cool.

A feature of the invention involves the slow mixing of the silver paste to be applied to the crystal. This slow mixing eliminates occlusion of air in the paste and provides for a smoother, more firmly bonded, silver spot on the crystal.

Another feature of the invention involves the finishing of the heat treated silver spot by a ball peen point, preferably mechanically driven. The wire lead to be attached to the crystal is then headed by a cold work process so as to be free of metal folds. After tining the head it is soldered to the silver spot.

These and other objects and features of the invention will be more fully understood from the following detailed description when read in conjunction with the drawing in which.

Figure 7:
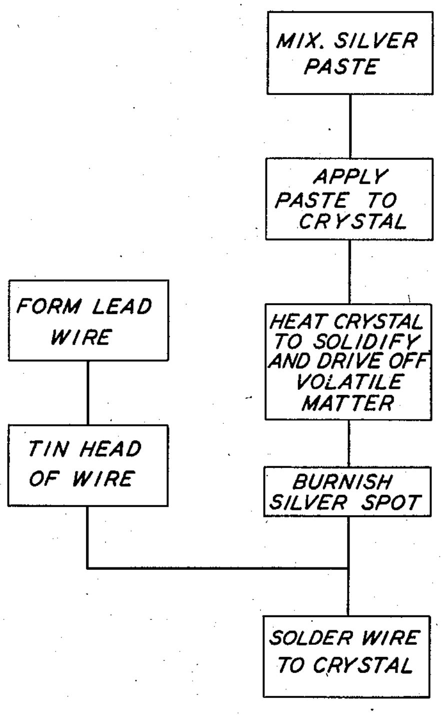
Figure 8:
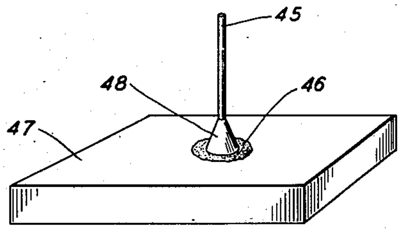

Figs. 3, 4, 5 and 6 individually illustrate the dies used in forming the head on the lead wires;

Fig. 7 is a flow chart which shows generally the steps taken in order to carry out the method herein described; and Fig. 8 shows a typical crystal and the attached lead wire.

Normally a silver spot is first formed upon the small portion of the clean surface of the quartz crystal. Then, after heat treatment of the silver spot, which will be described in detail later, the surfaces of the quartz crystal are coated with a metal such as silver by any one of well-known processes, such as evaporation. The silver paste used to form the silver spot may have as its constituents some silver particles of either a flake or granular nature, a low melting point glass flux such as lead borate as a binder, a resin in a solvent such as cellusol acetate, and a Carbitol acetate solvent which is used to slow down evaporation.

Specifically, a silver paste consisting of 53.9 per cent particles of silver by weight; 4.7 per cent lead glass flux by weight; 15.1 per cent resin in a solvent by weight, where the resin constitutes ⅓ by weight thereof, and 26.3 per cent Carbitol acetate by weight, may be used.

It is important that no air particles be occluded in the silver paste. It is therefore necessary that the silver paste from the time of its manufacture not be jarred excessively. Before use the paste must be mixed. In order to avoid occlusion of air particles in the mixing of the paste it should be rotated at a speed not greater than that speed at which turbulence begins. It has been determined that if the paste is mixed in a small container such as a two ounce container and rotated at a speed of one revolution per minute, negligible occlusion of air in the paste is encountered. It is to be noted that a paramount consideration in mixing the paste is the use of a speed that is not only slow but which is under that at which turbulence begins for the particular size and shape of mixing container used.

Once mixed the paste is ready for application to the crystal. It has been found convenient to apply paste to the crystal with a stylus. The area covered with paste need only be slightly greater than the area of solder used to connect the lead wire.

After the paste has been applied to the crystal, the crystal is placed in an oxygen containing atmosphere oven in order to heat treat the silver paste. The temperature of the oven is brought up to between approximately 510° C. and 570° C. in about ten minutes when a quartz crystal is used. For very large quartz crystals it may be necessary to consume more than ten minutes in bringing the temperature up to the required value; and in cases where the crystal is extremely small, the temperature may be brought up to the required value in less than ten minutes. It is to be noted that if temperatures could be controlled accurately enough it would be possible to heat the crystal to the Curie point of the crystal which is about 572° C. for quartz beyond which point the structure of the crystal changes. With ordinary furnaces, 550° C. maximum has been determined to be a safe temperature.

The primary consideration in determining the temperature rise is the ability of the crystal to withstand temperature gradients within itself. Most crystals such as quartz, for example, will show twinning effects or will even sometimes crack if the temperature gradient is too large. Thus it can be seen that the rate of temperature rise is controlled by the type crystal used and the size and shape of the crystal. When the temperature has reached a value of approximately 510° C. to 570° C., it is permitted to remain there approximately five minutes, which is the required time for the desired chemical action to take place within the silver paste and the volatile matters to be driven off. It is to be noted that the temperature may be left within this range for more than five minutes if desired.

After the crystal has remained in the oven at a temperature between approximately 510° C. and 570° C. for approximately five or more minutes the crystal is allowed to cool. The same considerations that determine the heating rate of the crystal also control the cooling rate of the crystal temperature, since the temperature gradients will be present just as when the crystal was being heated.

The silver spot is now ready to be burnished. In the prior art this was frequently done with an agate stylus operated by hand. The stylus would be moved over the silver surface in a spiral motion. In the present invention the burnishing can be accomplished by repetitive striking of the silver surface with a convex surface such as a ball peen point which is operated by a small electric motor or other suitable driving means. The ball peen point preferably travels in a path normal to the surface being treated. The ball peen point should be small in comparison with the area of the silver spot and moved around in order to effectively burnish the entire silver spot. It is to be noted that the ball peen point is used in preference to a flat or concave point since either of the latter two type surfaces would tend to cause shearing of the silver compound. A 60-cycle per second stroke of the ball peen point has been found to be satisfactory. However, slower rates and faster rates may be used successfully.

The silver spot is now properly prepared for the application of the wire lead. In order to assure a strong connection, the end of the wire lead is processed to form a head thereon. This is done by a series of steps in which successive dies are caused to impinge upon the end of the wire, thus cold working the metal into a shape similar, except for size, to that of the head of a flat screw without the groove.

Figures 1, 2, 3, 4, 5, 6:
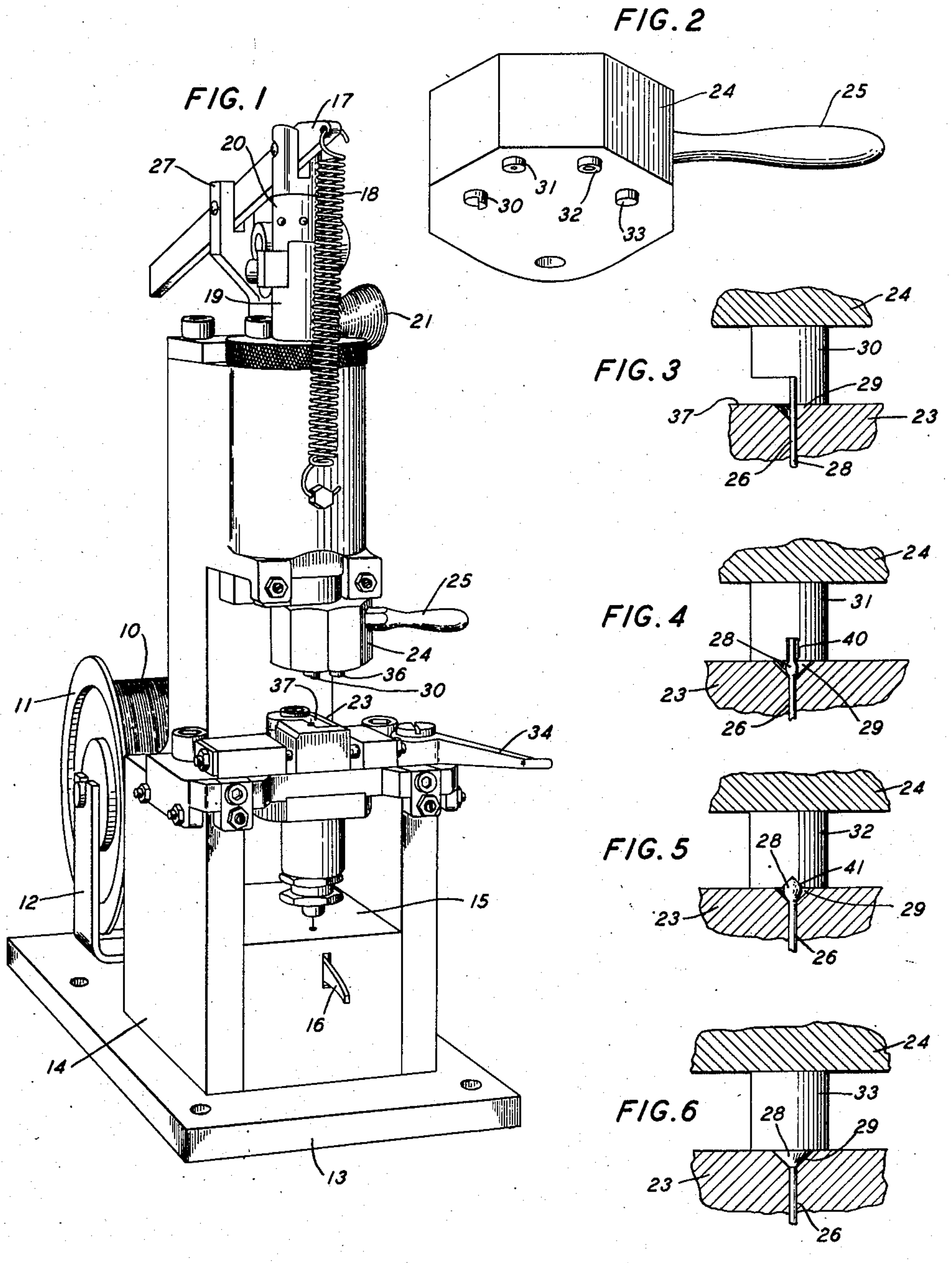
Fig. 1 is a perspective view of the mechanism to head the lead wire to be attached to the crystal.
Fig. 2 illustrates the dieholder and the dies used in heading the lead wires.

Referring now to Fig. 1 there is shown therein apparatus which will form the head of the wire in the desired manner. A coil of wire 10 is wound on reel 11 which is supported on base 13 by a bracket 12. A housing 14, also supported on base 13, encloses a drive mechanism 15 which advances the wire therethrough in desired lengths when lever 16 is operated. There are many ways well known in the prior art to accomplish this function of advancing wire of desired length so that description of the internal structure of device 15 is unnecessary. Gauge 30 and dies such as 36 are supported in holder 24 which is mounted upon shaft 20. The shaft 20 is swivel fastened at its upper end to lever 17 which in turn is mounted in an axis in yoke 27. A spring 18 maintains a continuous force upon one end of lever 17. The shaft 20 is caused to move longitudinally along its own axis by the rotation of crank arm 21 which causes a similar rotation of a cam (not shown) which in turn actuates lever 17. The wire to be headed is caused to extend through aperture 26 of the die block 23 shown in Fig. 3 by the device 15 shown in Fig. 1. By means of a pawl and rachet arrangement the various dies 36 can be individually caused to assume an exact, predetermined position over the wire extending through the aperture 26. When the desired die has been positioned over the wire the arm 21 is rotated causing said die to come down upon the head of the wire.

Referring now to Fig. 2, there is shown in perspective the die holder element 24, the gauge 30, and the three dies 31, 32, and 33 designated generically as dies 36 in Fig. 1. The gauge 30 is pressed down upon the wire and pushes the wire back into the aperture of die block 23 of Fig. 1 so that an exact predetermined length of wire extends out of the aperture. The wire is then clamped in this position and is cut to length by die movements (not shown) caused by moving cam lever 34. Then the dies 31, 32. and 33 are impressed upon the end of the wire in that order. Figs. 3, 4, 5, and 6 illustrate the action of elements 31, 32, and 33 upon the wire in more detail. In Fig. 3 it can be seen that the gauge 30 is pressed down upon the surface 37 thus exactly determining the length of wire extending out of aperture of die block 23. The die holder 24 is then rotated so that element 31 is over the wire. Element 31 is then brought down upon the wire so that the wire sets into the aperture 40 which is not quite deep enough to accommodate the length of wire extending out of aperture of die block 23. Consequently the metal wire is caused to flow as the result of the cold working, forming a node as is shown in Fig. 4. The die 31 is then removed from the wire and the die holder 24, is rotated so as to bring element 32 in position over wire. Next, as shown in Fig. 5 the die 32 is brought down upon the wire to further cold work the head of the wire. It will be noted that die 32 has a conical aperture therein into which the end of the wire is being worked. After the die 32 is removed from the wire, the die 33 is brought down upon the head of the wire as is shown in Fig. 6. Since die 33 has a flat surface with no aperture therein the head of the wire is caused to flow into the conical shaped portion 29 of aperture 26. The wire is then removed from the heading apparatus and is ready to be fastened to the crystal.

In the preferred embodiment of this invention, the head of the lead wire is soldered to the silver spot on the surface of the crystal. In preparation for this soldering, the head of the wire is first tinned with solder material such as lead-tin eutectic solder with 30 per cent silver added using a liberal application of a flux such as zinc chloride flux or phosphoric flux. The head of the wire is provided with a minute amount of flux, preferably phosphoric flux, and immediately thereafter placed on the silver spot of the crystal following which heat is applied to melt the solder and effect a bond between the wire and the silver spot. This heat may be applied by application of hot air under pressure of about two inches of water in excess of air pressure. As an alternative the heat may be supplied by radiation wherein a heater coil is placed around the lead wire and the said lead wire thereby becomes heated. This latter method of heating is fully described in United States patent application, Serial No. 68,223, filed December 30, 1948 for Arthur W. Ziegler, now Patent 2,602,872. By conduction the heat flows along the wire to the tinned headed portion thus melting the solder and effecting a bond between the lead wire and the silver spot.

After all wires have been soldered to the silver spots, the crystal should be cleaned. It is to be noted that prior to the soldering operation a very minute amount of flux is all that is required to have the solder flow properly during the soldering operation. Sufficient flux should be present if the headed wire is merely touched to a rod that has been dipped in the flux.

In Fig. 8 the head 48 of the lead wire is shown soldered to heat treated silver paste spot 46 which is bonded to the surface of crystal 47.

It is to be understood that the embodiment of the invention herein shown and described is to be taken as a preferred example of the same and that various changes may be made therein without departing from the spirit or scope of said invention.

What is claimed is:

1. A method of providing a surface of solderable material on a piezoelectric crystal comprising thoroughly mixing a silver paste slowly enough to avoid turbulence, immediately applying a spot of the thoroughly mixed silver paste to the surface of a crystal, slowly heating the silver paste spotted crystal to a temperature sufficient to solidify the paste and subjecting the silver spot to repeated blows with a convex surface.

2. A method of providing a surface of solderable material on a quartz piezoelectric crystal comprising thoroughly mixing a silver paste by rotating a container in which said paste is held at a speed low enough so that there is no turbulence of the paste, immediately applying the thoroughly mixed silver paste to a portion of the surface of a crystal, heating the crystal up to a temperature of from about 510° C. to 570° C. at a rate to avoid causing excessive temperature gradients in said crystal, maintaining said crystal at said temperature for at least five minutes, cooling said crystal at a rate to avoid causing excessive temperature gradients in said crystal and ball peening the applied silver.

3. A method of providing a spot of silver on a quartz piezoelectric crystal comprising thoroughly mixing a silver paste slowly enough to avoid turbulence, immediately applying the thoroughly mixed silver paste to the surface of a crystal to form a spot thereon, heating the silver paste spotted crystal in an oxidizing atmosphere at a temperature of from about 510° C. to 570° C. for a period of at least five minutes, cooling said crystal and subjecting the silver spot to repeated blows in a normal direction with a convex surface.

4. A method of providing a spot of silver on a quartz piezoelectric crystal comprising thoroughly mixing a silver paste slowly enough to avoid turbulence thereof and the consequent occlusion of air therein, applying said silver paste in a thoroughly mixed condition to a portion of the major surface of a crystal with a stylus, heating the silver paste spotted crystal up to a temperature of from about 510° C. to 570° C. slowly enough to avoid causing excessive temperature gradients in said crystal, maintaining said crystal at said temperature for at least five minutes, cooling said crystal slowly enough to avoid causing excessive temperature gradients in said crystal, and subjecting the silver spot to repeated blows with a convex surface to burnish said spot without dislodging any portions thereof.

5. A method of providing a surface of solderable material on a piezoelectric crystal comprising thoroughly mixing a paste of the solderable material at a rate sufficiently slow to avoid turbulence and the occlusion of air, immediately applying the thoroughly mixed paste to the crystal, slowly heating and cooling the paste-coated crystal to solidify the paste, and subjecting the silver spot to repeated blows with a smooth ball surface to burnish said spot without dislodging any portion thereof.

6. A method of providing a spot of silver on a quartz piezoelectric crystal comprising thoroughly mixing a silver paste by rotating a container in which said paste is held at a speed low enough so that there is no turbulence of the paste, immediately applying the thoroughly mixed silver paste to a portion of the surface of a crystal, heating the crystal up to a temperature of from about 510° C. to 570° C. at a rate to avoid undue temperature gradients in said crystal, maintaining said crystal at said temperature for at least five minutes, cooling said crystal at a rate to avoid the development of undue temperature gradients in said crystal, and subjecting the applied silver to repeated blows from a convex working surface of area smaller than the area of the silver surface under operation.

References Cited in the file of this patent

UNITED STATES PATENTS

| Number | Name | Date |
|---|---|---|
| 1,823,938 | Henke | Sept. 22, 1931 |
| 2,308,606 | Ingerson | Jan. 19, 1943 |
| 2,328,101 | Rosenblatt | Aug. 31, 1943 |
| 2,371,613 | Fair | Mar. 20, 1945 |
| 2,426,650 | Sivian | Sept. 2, 1947 |
| 2,461,878 | Christensen | Feb. 15, 1949 |
| 2,531,660 | Ziegler | Nov. 28, 1950 |